United States Patent [19]

Scantland et al.

[11] Patent Number: 4,751,843
[45] Date of Patent: Jun. 21, 1988

[54] TIRE INSPECTION APPARATUS

[75] Inventors: Joe F. Scantland, Akron; Frederick J. Huffman, Tallmadge, both of Ohio

[73] Assignee: Scantland Industries, Inc., Akron, Ohio

[21] Appl. No.: 39,512

[22] Filed: Apr. 17, 1987

[51] Int. Cl.⁴ .............................................. G01M 17/02
[52] U.S. Cl. ......................................................... 73/146
[58] Field of Search ........................................... 73/146

[56]  References Cited
U.S. PATENT DOCUMENTS

| 3,698,233 | 10/1972 | Braden et al. | 73/146 |
| 3,987,672 | 10/1976 | Loyer | 73/146 |
| 4,078,339 | 3/1978 | Ongaro | 73/146 |
| 4,327,579 | 5/1982 | Weiss | 73/146 |

Primary Examiner—Donald O. Woodiel
Attorney, Agent, or Firm—Oldham, Oldham & Weber Co.

[57] ABSTRACT

Apparatus for exposing the interior of tires including a rotary disc for receiving and positioning a tire on its side thereon and members engage the bead of a tire for positioning the tire and holding one bead and sidewall portion against the rotary disc to cause the tire to rotate with the disc and permit inspection of at least a portion of the interior wall of a tire being inspected, and a second rotary disc is positioned spaced from the first named means to receive the tire thereon and other members engage a bead and sidewall portion of the tire to expose a different inner sidewall area of the tire for inspection purposes. Other members are present to transfer a test tire from one rotary disc to the other and to turn the tire through a 180° arc while being transported from the first disc to the second disc.

8 Claims, 7 Drawing Sheets

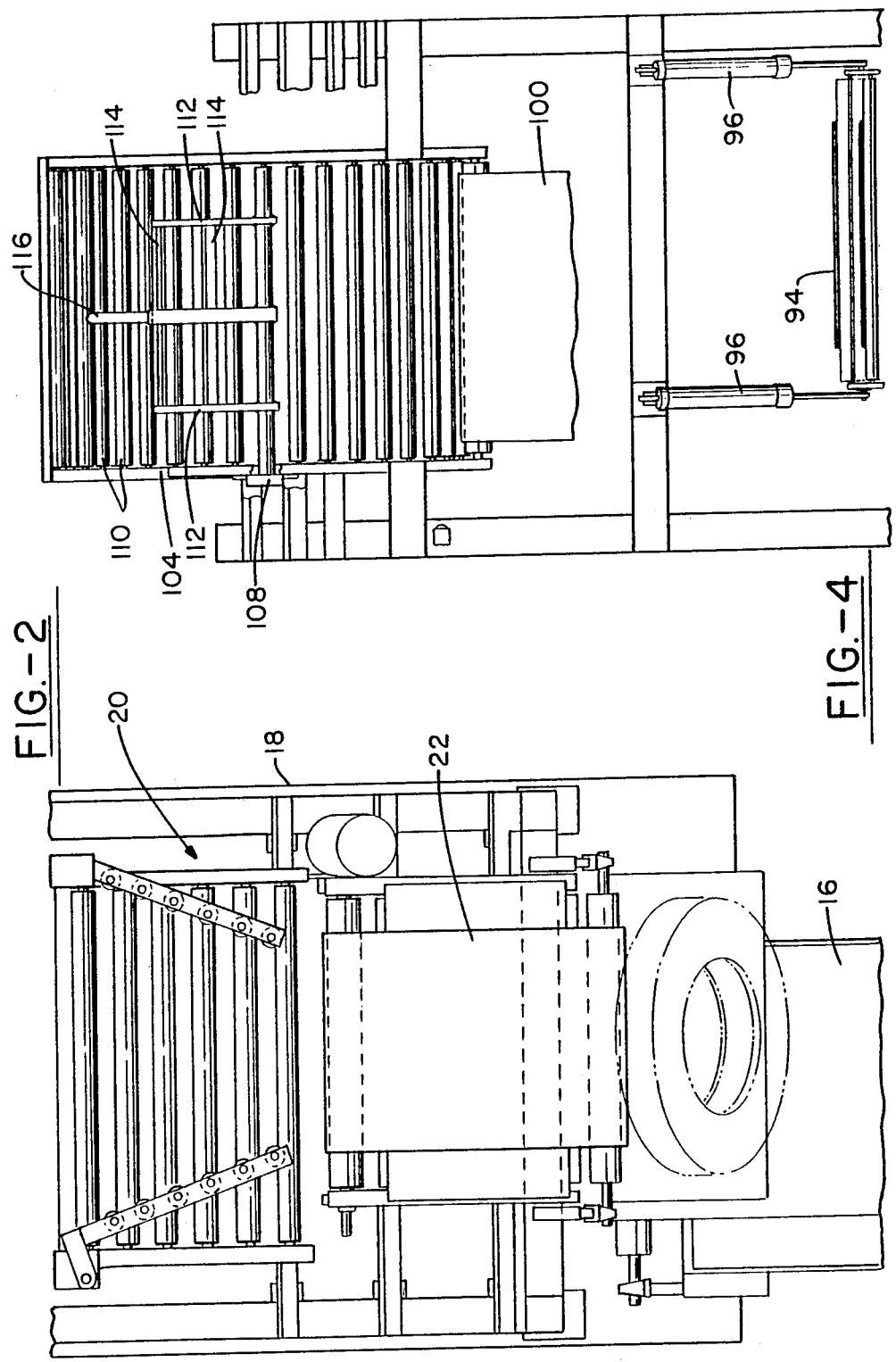

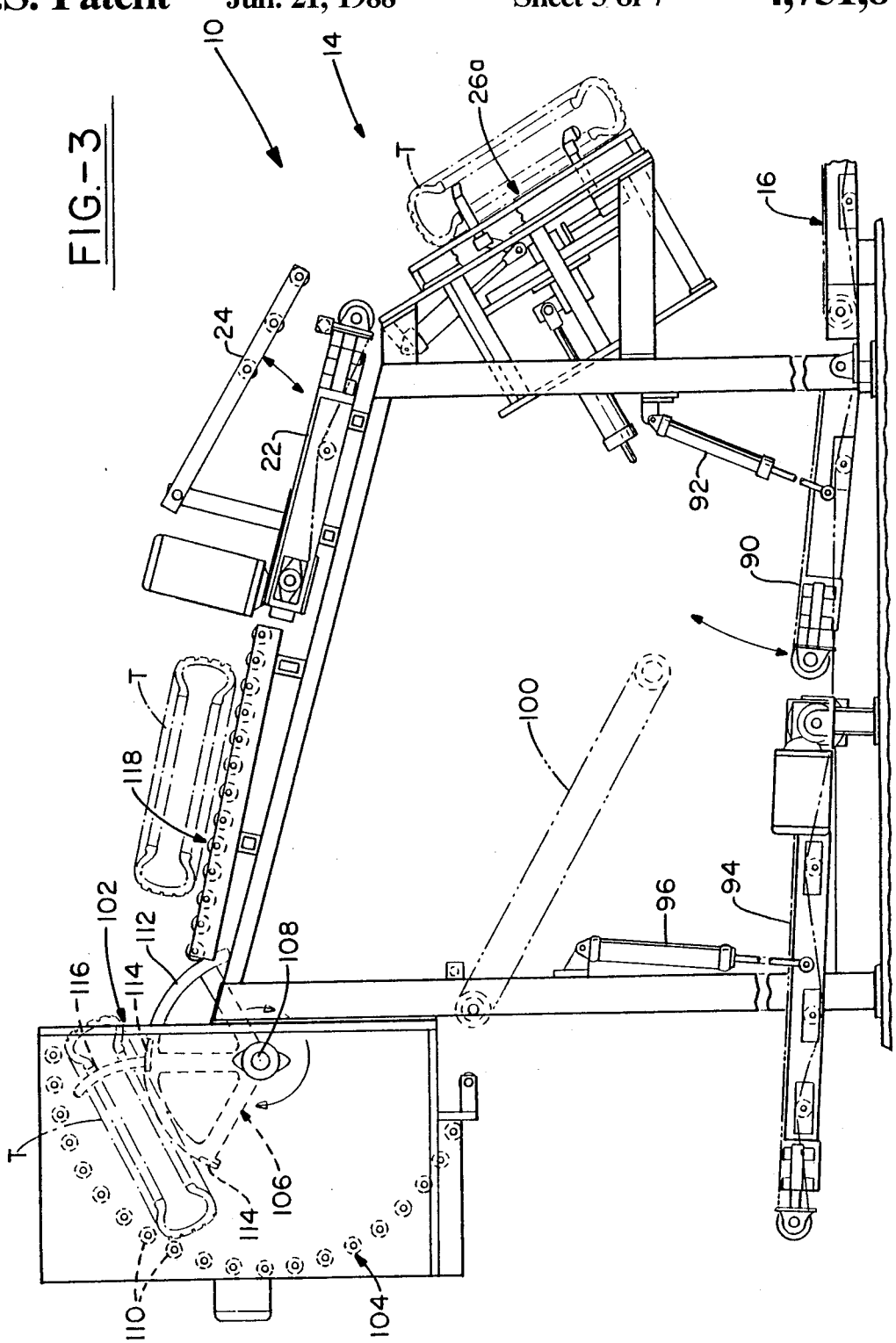

TIRE INSPECTION APPARATUS

TECHNICAL FIELD

This invention relates to tire inspection apparatus and particularly to rotary apparatus for engaging and rotating a tire while distorting a progressive portion of the tire sidewall to permit inspection of a portion of the tire interior while the tire is engaged by the inspection apparatus.

BACKGROUND ART

Heretofore there have been many different types of tire test and tire inspection apparatus, systems or methods provided for testing various portions of a pneumatic tire after the tire has been manufactured and prior to use thereof. One particular source of problems in pneumatic tires is that the interior walls of the tire are not perfect. That is, the innermost ply or surface of the tire might have different types of imperfections thereon or protuberances can exist on the tire wall. These inner imperfections of the tire are difficult to spot because of the inaccessibility of the inner tire surface for inspection for checking purposes.

Various efforts have been made heretofore to test and/or inspect all portions of the tire including the inner wall surfaces thereof. But, in so far as we are aware, none of the prior test and/or inspection apparatus has provided an efficient, low-cost type of tire inspection system that can perform quickly yet provide easily practiced inspection methods for the interior of the tire. With emphasis being placed today upon quality products that are made available for competitive prices, the need for complete interior tire wall inspection of pucumatic tires is made more important in the commercial tire production field at the present time.

The general object of the present invention is to provide a novel and improved tire inspection apparatus and especially one that can function substantially automatically for inspecting the complete interior surface of a tire, which apparatus is used in association with an inspector associated with the apparatus to provide a visual eye-balling of the tire as it is being processed in the tire test and/or inspection apparatus.

Yet another object of the invention is to combine a pair of positioning discs for a tire when it is being passed through a tire inspection process wherein one sidewall of the tire can be inspected at one test disc and a second and further portion of the tire interior can be inspected at the second test disc or station.

Another object of the invention is to provide a means that can automatically aid in the positioning of a tire for test or inspection of its interior wall surface, to release the tire from one test position, move it automatically to a second test position, and to position the tire on its opposite side wall at a second test station for inspection of the remainder of the interior wall surface.

Further objects of the invention are to provide a new and improved tire engaging arm for engaging a tire to mount it operatively at a tire inspection station to cause the tire to rotate with a rotary tire mounting plate, and to distort the tire bead and sidewall at a local area thereof as the tire is being rotated and to facilitate inspection of a tire sidewall interior wall at one test station by the inspector eye-balling the tire at that location; and, thereafter, to provide a duplicate test of the tire when positioned on its opposite sidewall to facilitate completing the inspection of the tire inner surface.

Another object of the invention is to provide a novel and improved apparatus for turning a tire, when lying on one sidewall thereof, through a 180° are by the turning apparatus; and, ultimately, to position a tire on its opposite sidewall.

Another object of the invention is to provide a sturdy, dependable, positive apparatus for stabbing a positioning finger into engagement with a tire, moving the tire through a 180° are and holding the tire against the lift and control apparatus by a retainer or backup roller frame associated with the tire engaging member.

The foregoing and other objects and advantages of the invention will be made more apparent as the specification proceeds.

BRIEF DESCRIPTION OF THE DRAWINGS

For a better understanding of the invention, attention now is directed to the accompanying drawings wherein:

FIG. 2 is a fragementary plan view of the apparatus of FIG. 1;

FIG. 3 is a side elevation of the second portion of the tire inspection apparatus partially shown in FIG. 1;

FIG. 4 is a fragmentary modified right side elevation of a portion of the apparatus of FIG. 3;

When referring to corresponding members in the specification and which members are shown in the drawings, corresponding numerals are used to facilitate comparison between such corresponding elements shown in the drawings and referred to in the specification.

BEST MODE FOR CARRYING OUT THE INVENTION

Figure 1:
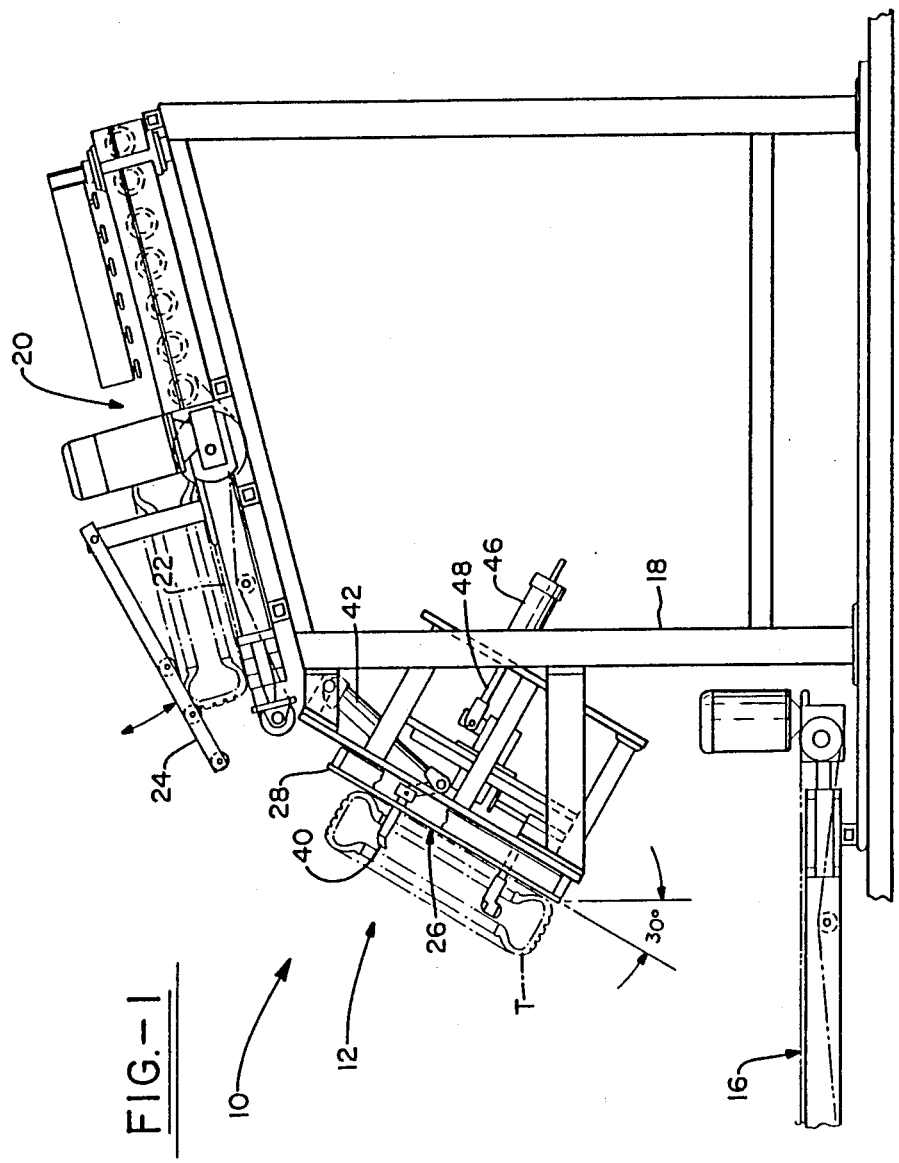
FIG. 1 is a side elevation of a first portion of the tire inspection apparatus of the invention.

Attention now is particularly directed to the details of the structures shown in the accompanying drawings, and a tire inspection apparatus is indicated as whole by the numeral 10. This apparatus 10 includes a general assembly first stage portion of the apparatus indicated as a whole by the numeral 12 and a second stage general assembly portion of the apparatus is indicated as a whole by the numeral 14. Conventional belt conveyor 16 is provided to operatively connect the first and second stages of the apparatus 10 for transport of tires therebetween as hereinafter described in more detail.

FIRST STAGE

The tire inspection apparatus includes a frame 18, which positions a conventional tire supply conveyor 20 on an upper portion thereof and this conveyor may include a driven belt for feed of tires to be inspected to a discharge portion of a second driven conveyor belt 22 at a lower end of the end feed portion of this first stage assembly. Preferably a pivotally positioned hold down 24 is operatively positioned above this conveyor belt 22 and will retain a tire on this upper portion of the end feed section of the apparatus until the operator is ready to inspect that particular tire. Feed of the tires to be inspected can be supplied in any desired manner and this retainer means 24 can be mechanically actuated for tire release, or it can be manually swung upwardly, as desired, by the operator of the inspection apparatus when a tire is to be admitted into the apparatus for inspection purposes.

Figure 7:
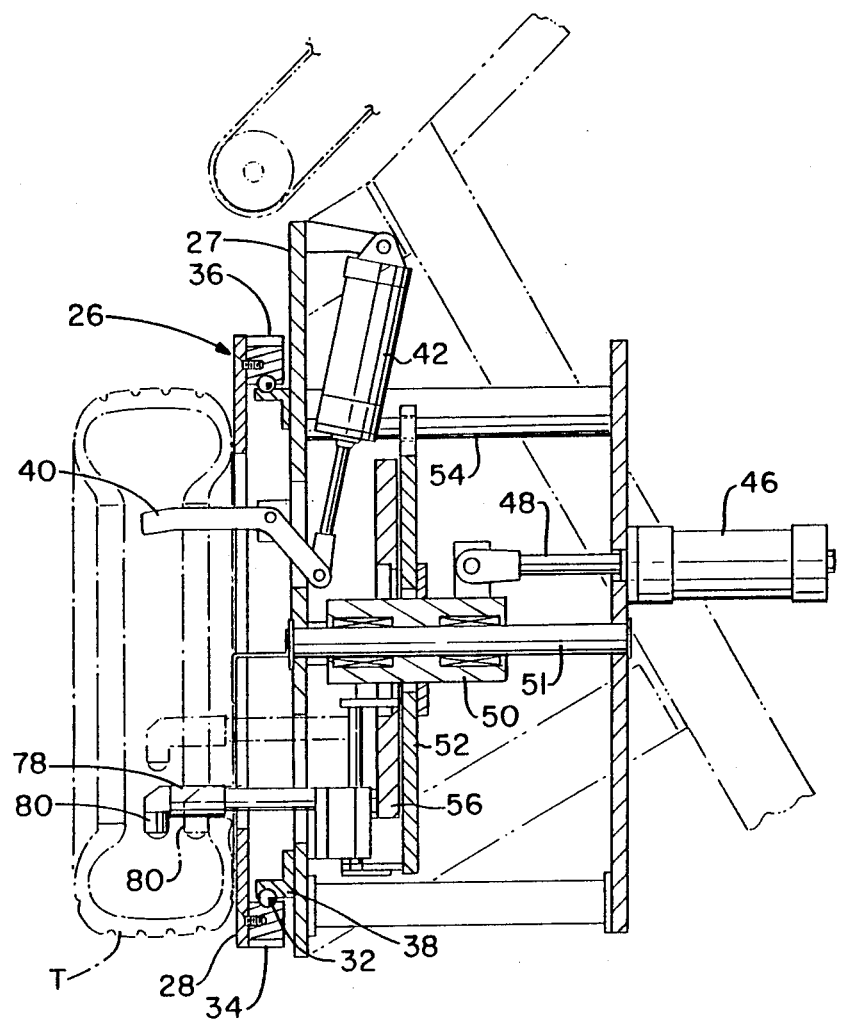
FIG. 7 is a section through the basket apparatus of the invention and indicating the tire bead engaging arms in position for engaging a tire bead.
Figure 8:
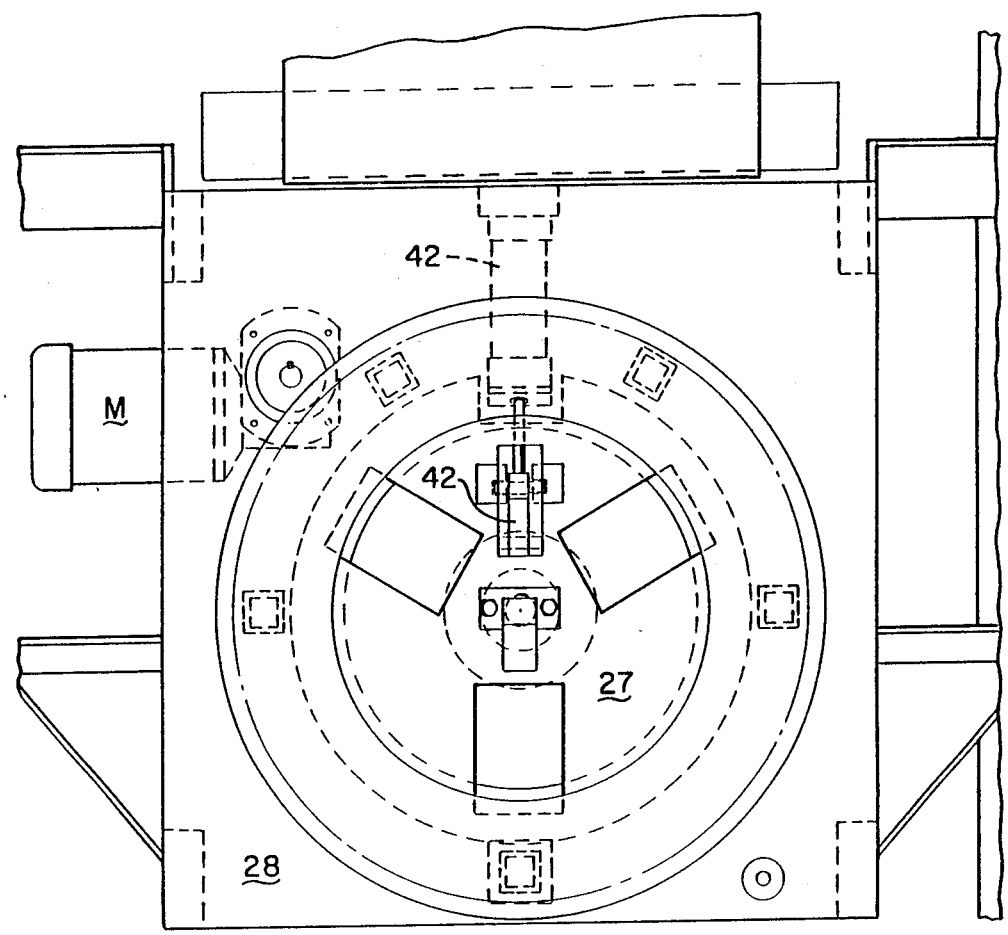
FIG. 8 is a plan or direct front elevation of a head assembly of the basket of the apparatus as shown in FIG. 6.

A tire positioner and/or inspection means is operatively positioned adjacent and below the discharge end of the conveyor means 16 and this means may include a basket assembly indicated as a whole by the numeral 26. The basket assembly is suitably positioned at an angle to the vertical as indicated in FIG. 1 and is secured to the frame 18. The basket assembly includes a support disc 28, having an open center 30, with such support disc being rotatably mounted on bearings 32 engaging an annular flange 34 on the back of the support disc 28 and rotatably positioning this support disc on a support flange 38 forming part of the frame of the basket assembly 26. FIG. 7 shows this feature of the basket assembly 26, and a ring gear 36 is carried by this rear flange 34 on the support disc 28 and which flange 34 overlaps actually the flange 38 for rotary support for the support disc. Any conventional drive gear engages with this ring gear 36 and will rotate the support disc on the apparatus under any desired type of electrical control provided therefor.

When the operator is ready to release a tire held in position by the retainer means 24, he will merely release this retainer means or actuate its control whereby a tire would move off (or drop off) of a conveyor belt 22 by a control provided for such release, and at the same time such control would actuate, in timed response to the release of the tire, a positioning or engaging finger 40. This tire engaging finger is pivotally mounted on a part of a frame 27 of the basket assembly and a suitable power control therefore, such as an air cylinder 42, is connected to one end of the finger 40, whereby actuation of the air cylinder can be used to either position this finger operatively to extend out in an axial direction from the basket assembly 26 or to retract the finger where it is pulled down below the surface of the support disc 28. The finger 40 thus is adapted to be positioned as shown in FIG. 7 so as to be stabbed into the tire as it is sliding down over the surface of the support disc 28 and to engage the tires inner periphery and terminate downward movement thereof.

Figure 6:
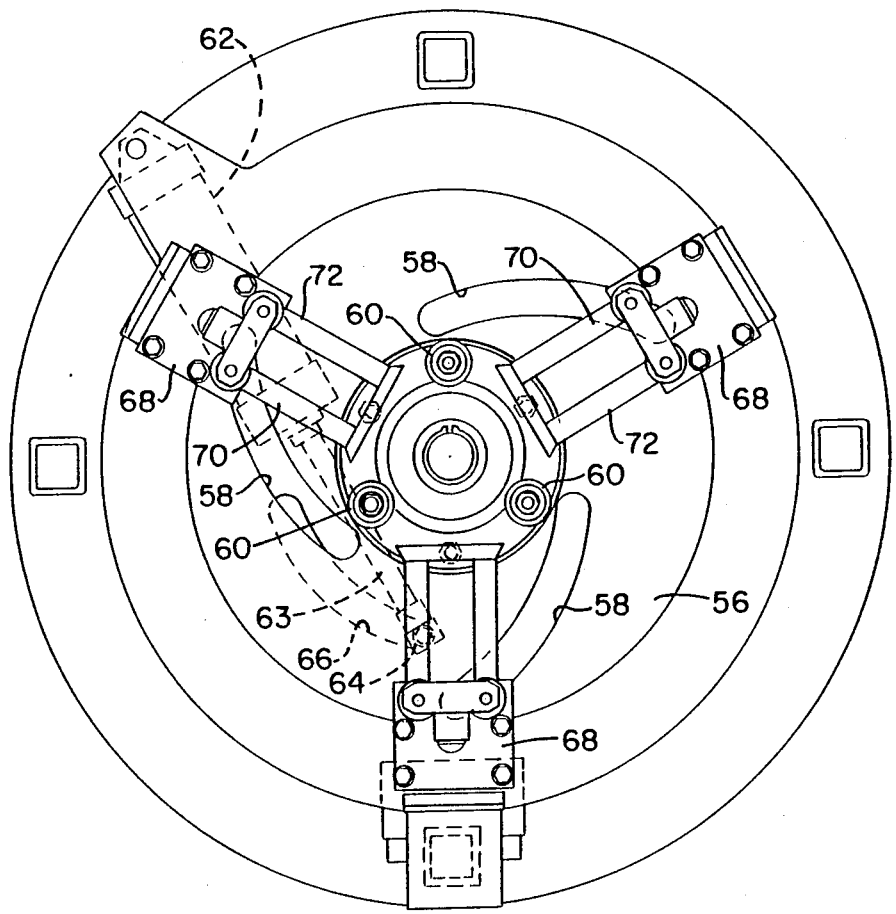
FIG. 6 is a left side elevation of the basket apparatus of FIG. 5.

So as to center a test tire indicated at T in the drawings, centrally of the basket assembly 26, three tire engaging shafts or rods 44 are operatively positioned on the frame 27 of the basket assembly and these rods are designed to be moved axially by control air cylinder 46 that is operatively positioned adjacent the back end of the basket assembly. The air cylinder 46 by its piston rod 48 engages a sleeve or cylinder 50 that is positioned to slide on the axis of the frame 27 of the bracket. The cylinder 50, in turn, is secured to a disc or plate 52, which is mounted on a plurality of support rods 54, to slide along these support rods for movement axially of the basket assembly 26. The plate 52 positions the tire engaging rods 44 thereon to move them axially of the basket while a scroll plate 56 is provided for another control action and it has arcuate slots 58 as shown in FIG. 6.

Figure 5:
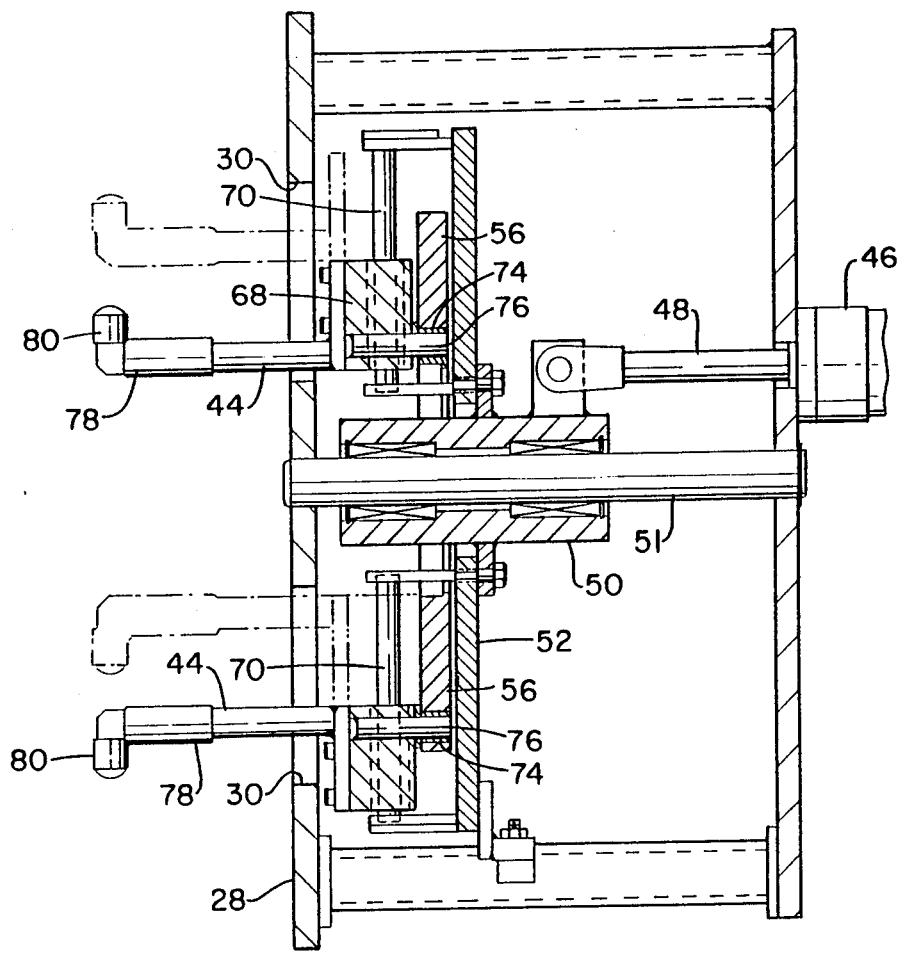
FIG. 5 is a fragmentary seciton through a basket assembly of the apparatus of the invention.

The scroll plate 56 is itself operatively positioned for rotary action by a plurality of cam follower bearings 60 that engage the inner periphery of this scroll plate. Arcuate movement of the scroll plate 56 is provided by a conventional air cylinder 62 that engages a peripheral portion of the frame 27, or a member thereon and it operatively connects to the scroll plate as by a suitable connector block 64 or other known member to secure piston rod 63 to a control slot 66 that is formed in the scroll plate. Actuation of the air cylinder 62 thus will move the scroll plate 56 through a limited arc, and this is used to produce radially directed movement of individual support blocks 68 that are shown in FIGS. 5 and 6. These support blocks are individually mounted on individual pairs of guide or positioning slide rods 70 and 72. These pairs of parallel slide rods 70 and 72 are positioned in balanced relationship on carrier plate 52 with scroll plate 56 positioned between carrier plate 52 and the slide rods 70 and 72 and blocks 68. Radial movement of the support block on the slide rods 70 and 72 is provided by a rotary bearing 74 on a stub rod 76 secured to the support block but extending therefrom so that the bearing 74 is individually positioned in one of the slots 58 in the scroll plate for control of the radial position of the support block in relation to the carrier plate 52 to be controlled by actuation and arcuate movement of the scroll plate 56, more or less as conventionally done in tire building apparatus.

FIG. 5 of the drawings clearly shows that the tire engaging shafts or rods 44 are individually mounted in the different slide blocks 68 and that the positions of the slide blocks 68 and tire engaging shafts 44 are thus controlled through scroll plate 56. Additional positioning of these rods is provided, of course, by the air cylinder 46, which in turn moves the cylindrical sleeve 50 on its support rod 51 for movement of the tire assembly of the tire engaging shafts or rods 44 in relation to the support disc 28 and any tire positioned thereon.

So as to facilitate engagement of the tire engaging shafts or rods 44 with a tire, roller sleeves 78 are shown engaged with the axially extending portions of these engaging shafts and further rollers or bearings 80 are positioned on over-hanging or offset end portions of the shafts so as to be adapted to engage with the radial inner surface of beads of the tire when the tire engaging shafts 44 are moved in the proper direction to engage with the beads of a tire. The shafts 44 then are moved axially to bring the over-hanging end bearings 80 of the tire into engagement with the bead of the tire. Hence, a tire bead lying adjacent the support disc 28 can be brought close thereto or thereagainst, as suggested in FIG. 7 whereby frictional engagement of the tire with the support disc 28 is provided and the tire will rotate with the support disc. The roller members on the shafts 44 will of course permit such relative rotation between the tire engaging shafts and members thereon and the tire. This flattening action of the tire will permit an inspector who is standing adjacent to the first stage of the apparatus of the invention to examine or "eye-ball" one inner sidewall portion of the tire as he looks into the tire as it is positioned on and rotated with the support disc 28. The inspector will readily recognize when the tire has completed an annular inspection or sufficient rotary movement so that the inspector can have examined the tire inner sidewall completely on one sidewall portion thereof and then the inspector can actuate conventional control means provided therefore so as to release the tire by retraction of the tire support arms 44, and consequent drop of the tire down on to the conveyor means connecting the first stage of the apparatus to the second stage.

The tire will then slide off the support disc down onto the conveyor means 16.

SECOND STAGE

Reference now is particularly directed to the details of the apparatus shown in FIG. 3 of the drawings, wherein the conveyor means 16 is shown as transporting pneumatic tires which are under inspection from the first stage of the apparatus over to further inspection at the second stage. Thus a receiving or connecting conveyor means 90 is operatively carried by the frame of the second stage 14 and it is pivotally secured at its upstream end to this second stage apparatus, but with the operative position of the conveyor means 90 being controlled by a conventional member such as an air cylinder 92. Such air cylinder 92 pivotally connects to the conveyor means and its mounting apparatus, whereby the conveyor means can be moved through an arc centered at its upstream end adjacent the conveyor means 16 and adapted to receive the tire under test therefrom. Thus, the conveyor means can be used for transporting the tire under test to a discharge conveyor 94 which likewise is pivotally positioned on its carrier frame at its upstream end in a suitable manner so that an air cylinder 96 connecting to this positioning frame can raise and lower the discharge end of this conveyor whereby tires can be separated to be accepted or rejected by the height of the end of the discharge conveyor 94 when the actual tire discharge occurs.

However, the usual tire under inspection and which has only been inspected in one sidewall inner portion thereof should be processed with the conveyor means 90 in its elevated position, at which time such conveyor transmits the tire under test to a second connector conveyor means 100 which is suitably operatively positioned in inclined upwardly position as indicated in FIG. 3 for receiving a tire from the conveyor means 90 and transmitting it upwardly of the apparatus for engagement and action thereon by a tire turner means or device 102. This tire turner means 102 includes a turnover fixture 104 and a tire engaging and carrier means 106 that is positioned for rotary movement in the tire turner, and is centered on its support axis 108. The tire turner means 102 comprises a plurality of roller bars 110 that are positioned in parallel relation and form an arc of about 180° in length that is centered on the support axis 108 of the tire engaging and carrier means 106. The tire engaging and carrier means, or tire carrier comprises a pair of edge spiders 112 of arcuate shape and which are carried by the support shaft 108 at the ends or adjacent the ends of this shaft 108 and at least a pair of connector or cross bars 114 are secured to and extend between these edge spiders 112 to make a partial slotted drum on the periphery of these edge spiders 112. The tire carrier also includes an arcuate tire engaging finger 116 that is adapted with rotation of the tire carrier 106 to be inserted into a tire as it is at the upper end (or discharge end) of the upwardly canted connector conveyor 100 and engage the center portion of the tire to pull it from the conveyor. Such conveyor is in operative relationship with the turn-over fixture 104 so that as the tire engaging finger 116 is stabbed into the tire and then engages the beads of the tire, it raises and slides the tire off the conveyor onto the roller bars 110. These bars and the tire carrier 106 are in such operative relationship that the tire is pressed against the roller bars by the cross bars 114 and held against such roller bars and in engagement with the tire engaging finger 116 to be moved through an upward arc and be transferred from this turnover fixture 104 onto a receiving conveyor 118 that is downwardly inclined in the apparatus and presents the tire under inspection with a different upward surface or bead in the sidewall area than was the upper sidewall when the tire was processed in the first stage of the apparatus.

The second stage of the apparatus as indicated as 14 has a belt conveyor and a retainer means like the belt conveyor 22 and retainer means 24 of the first stage of the apparatus and such portions of the apparatus can be actuated in any conventional manner as stated before.

A basket assembly 26a is provided in the second stage assembly 14 and this is the same construction as the basket assembly 26 described heretofore. The tire hence will have a different area of its inner wall surface exposed for inspection by the operator of the tire inspection apparatus 10 so that he can complete the examination of the tire being checked. The apparatus is adapted to position the tire being inspected at an angle to the vertical and to facilitate "eye-ball" examination and inspection of the tire's inner surface by the inspector at the first and second stages of the apparatus to inspect the complete inner surface of a tire. When the tire is released from the second basket assembly 26a, it will be deposited again onto the conveyor means 16 which in turn will transport the tire to the conveyor 90 and to the conveyor 94 for acceptance or rejection or discharge action as set up by the operator of the inspection apparatus.

The conveyor 118 has the rollers and their supports suitably cut away at the center thereof as shown at 130 to enable the tire engaging finger 116 to move thereby. Various parts are omitted from the drawings in some views for clarity for the parts shown.

It should be realized that any desired types of controls can be provided for driving the various driven portions of the apparatus and that the various belt conveyors can be driven continuously or intermittently depending upon the number of tires being inspected. Suitable controls, such as photo-electric eyes can be provided to actuate drive motors as desired and other conventional controls may also be provided.

Inasmuch as the tire turner means 102 includes the tire carrier 106 that is rotated through a circle or an operative cycle to engage a tire, and turn it through a 180° arc which can be described as that made by a plane defined by the tire itself being turned over 180°. This turn-over action facilitates inspection of the complete interior of the tire sidewall.

From the foregoing, it is submitted that a novel and improved type of a tire inspection apparatus has been provided and the apparatus greatly facilitates inspection of the entire interior surface wall of a tire by the tire inspector. Thus, it is believed that the novel and improved apparatus and the provision thereof have achieved the objects of the invention.

While in accordance with the patent statutes only a preferred embodiment has been illustrated and described in detail, it is to be particularly understood that the invention is not limited thereto or thereby, but rather is measured by the scope of the attached claims.

What is claimed is:

1. An apparatus for exposing the interior of tires comprising
a rotary disc for receiving a tire to lie thereon, means for engaging a bead of a tire on said rotary disc for holding one sidewall against said rotary disc to cause the tire to rotate with said rotary disc and permit inspection of at least a portion of the interior wall of a tire being tested, a second rotary disc spaced from said first named rotary disc for receiving a tire to lie thereon, a transport conveyor means to receive a tire from said first named rotary disc to transfer it to the vicinity of said second named rotary disc, said transport conveyor means including a driven tire engaging member to engage a tire and turn it through about a 180° arc, a back-up roller frame associated with said tire engaging member to engage and aid in positioning a tire as engaged and turned by said tire engaging member, and a second named means for engaging a bead of a tire to hold an opposite sidewall against said second rotary disc and enable the inspection of another portion of the interior wall of a tire being inspected.

2. In a pneumatic tire inspection apparatus the combination comprising a rotary tire support disc for supporting a tire thereon by its sidewall, said support disc having an open center, three tire engaging arms positioned in balanced relation and extending axially of said support disc in the open center thereof, roller means on the ends of said arms for tire bead engaging action, and positioning means for said arms to move them radially to and from tire bead engaging positions, said positioning means also being adapted to move said arms axially to move said roller means to engage a tire bead and move it and the adjacent sidewall against said support disc for rotation therewith.

3. A pneumatic tire inspection apparatus as in claim 2, where each of said arms has an offset end, and roller means are present on both said arms and said offset ends, said offset ends being adapted to engage tire bead areas of a tire.

4. A tire inspection apparatus as in claim 2, where said positioning means include a postioning disc for said tire engaging arms, a reciprocatory sleeve engaging said positioning disc to position it parallel said tire support disc and maintain such parallel relation in operation, and where said tire engaging arms function to flatten part of a tire sidewall against said support disc to make more of the interior of a tire visible, said tire support disc being positioned at an angle of about 30° to the vertical and being inclined towards an inspector to facilitate view of a tire inner wall.

5. A tire inspection apparatus as in claims 2, where said positioning means include a positioning disc for said tire engaging arms, three radially positioned slide bar means on said positioning disc, a slide block on each of said slide bar means and each carrying a tire engaging arm, a scroll plate on said positioning disc and engaging said slide blocks, and means to move said scroll plate through a reciprocable arc to move said tire engaging arms radially of said tire support disc.

6. In a tire inspection apparatus, the combination comprising a conveyor means for receiving a tire to lie thereon to feed it to a pick-up station, a driven rotary tire engaging member including a stab-in finger to engage a tire, said tire engaging member also comprising a support frame of arcuate shape, and an arcuate back-up roller frame associated with said tire engaging member to engage and aid in positioning a tire as engaged and turned through a 180° arc by said tire engaging member.

7. In a tire inspection apparatus as in claim 6, where said roller frame forms an arc of about 180° in length and said tire engaging member is on an axis located at the center of said roller frame arc.

8. In a tire inspection apparatus as in claim 6, where said support frame has said finger at a center portion thereof and said frame is of slatted construction downstream of said finger to bear on a tire in process, and a conveyor means is provided to receive tires from said tire engaging means.

* * * * *